(12) United States Patent
Mulcahy

(10) Patent No.: US 12,521,844 B1
(45) Date of Patent: Jan. 13, 2026

(54) MASSAGE GUN HOLDER

(71) Applicant: John Mulcahy, Walpole, MA (US)

(72) Inventor: John Mulcahy, Walpole, MA (US)

( * ) Notice: Subject to any disclaimer, the term of this patent is extended or adjusted under 35 U.S.C. 154(b) by 875 days.

(21) Appl. No.: 17/847,745

(22) Filed: Jun. 23, 2022

Related U.S. Application Data

(60) Provisional application No. 63/202,752, filed on Jun. 23, 2021.

(51) Int. Cl.
*B25B 5/06* (2006.01)
*F16M 11/04* (2006.01)

(52) U.S. Cl.
CPC ........... *B25B 5/068* (2013.01); *F16M 11/046* (2013.01); *A61H 2201/0126* (2013.01)

(58) Field of Classification Search
CPC ............ B25B 5/006; F16M 11/04–043; F16M 11/046; F16M 2200/02; F16M 2200/025; F16M 2200/027; F16M 2200/028
See application file for complete search history.

(56) References Cited

U.S. PATENT DOCUMENTS

| 1,660,329 | A | * | 2/1928 | Fleming ................ B25B 1/04 269/270 |
| 4,311,295 | A | | 1/1982 | Jamar, Jr. |
| 5,680,725 | A | * | 10/1997 | Bell ...................... F41G 11/003 42/127 |
| 5,871,192 | A | | 2/1999 | Horwitz |
| 5,944,294 | A | | 8/1999 | Baer |
| 6,494,327 | B2 | | 12/2002 | Huang |
| 7,155,840 | B1 | | 1/2007 | Carbonaro |
| 7,721,363 | B2 | | 5/2010 | Huang |
| 8,397,421 | B2 | * | 3/2013 | Ding ..................... F41G 11/003 42/127 |
| 2006/0060748 | A1 | | 3/2006 | Darre |
| 2018/0289179 | A1 | | 10/2018 | Fastermann et al. |

OTHER PUBLICATIONS

McQueen Enterprises LLC, Space Saver Gym, https://myosource.com/space-saver-gym-resistance-band-wall-anchor-1-rail-1-rail-car/.

VNE Corporation, Clamps, https://www.vnestainless.com/fittings/clamp-fittings/clamps.

* cited by examiner

*Primary Examiner* — Tyrone V Hall, Jr.

(57) ABSTRACT

A massage gun holder with an elongated rail that attaches to a mounting surface and a shuttle that holds the gun and that can move longitudinally on the rail. At least one side edge of the rail has a linear gear. The shuttle has a body with a curved depression in the front surface for the gun handle. A handle clamp pivots to secure the handle of the massage gun in the depression. The shuttle slides on the rail in a vertical rail slot on the back of the shuttle body and is secured to the rail by a rail clamp. A cam mechanism moves the rail clamp between an engaged position, where studs in the side wall of the rail slot engage the linear gear, and an unengaged position, where the studs are disengaged from the linear gear.

7 Claims, 19 Drawing Sheets

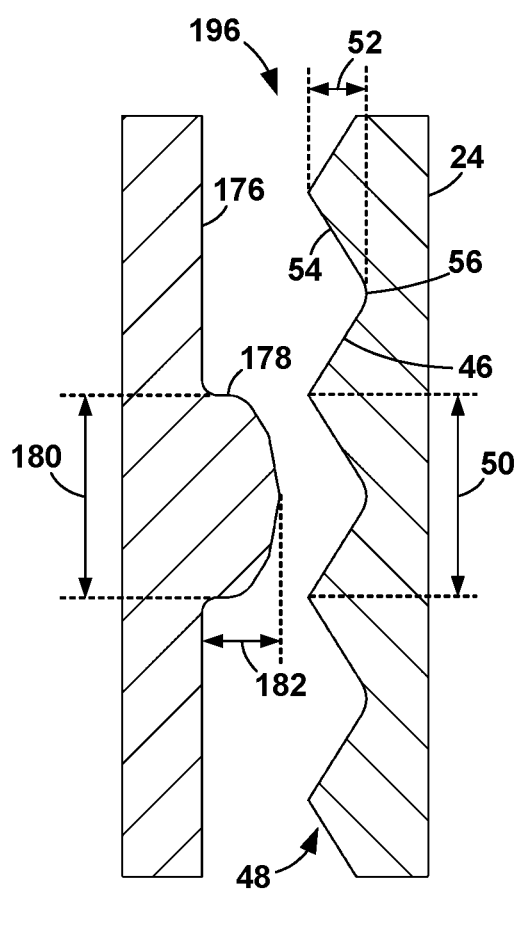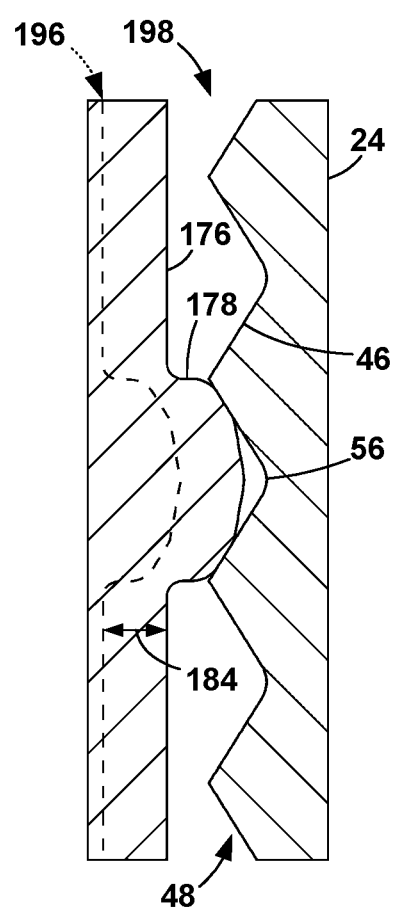
FIG. 21  FIG. 22

MASSAGE GUN HOLDER

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to massage guns, more particularly, to a device for holding the massage gun on a wall.

2. Description of the Related Art

A massage gun provides percussive therapy by a reciprocating head. The typical massage gun has a generally straight handle for gripping, with the head extending generally perpendicularly from the handle. The user holds that handle to apply the reciprocating head to the desired part of the body. When holding the massage gun as intended, it is impossible or nearly so to reach some areas of the body. Also, because massage guns are heavy, holding one for a long time can be fatiguing.

BRIEF SUMMARY OF THE INVENTION

The present invention holds a massage gun so the user does not have to. The holder can be used for any number of reasons. It can be used to hold the massage gun in the correct position and orientation for application to the user's body that he/she cannot easily reach. The holder can be used to hold the massage gun so that the user does not become fatigued because of massage gun's weight. The holder can be used to hold the massage gun so that the user can push harder against the massage gun than can be done manually for a forceful massage.

The massage gun holder has an elongated rail that attaches to a mounting surface, and a shuttle that holds the massage gun and that can move longitudinally on the rail.

The rail can be any length but is preferably at least 12 inches long. The rail can mount in any orientation, but typically vertically. The rail has a mushroom-shaped cross-section with a base and a head. The base is secured to the mounting surface, typically by screws. Each longitudinal side edge of the head tapers to a blunt apex. The apex is cut into a series of teeth that forms a linear gear extending nearly the full length of the rail. In one configuration, both edges have linear gears. In another configuration, one edge has a linear gear and the other edge is only tapered. In another configuration, one edge has a linear gear and the other edge is not tapered, only slanted.

The shuttle rides on the rail and can be secured to any desired position along the rail as precisely as the tooth pitch permits. The shuttle has a body, a handle clamp, and a rail clamp.

The body has a curved depression in the front surface for the gun handle. The handle clamp secures the handle of the massage gun in the depression. The handle clamp pivots relative to the body on a clamp hinge between an open position, where the massage gun is not secured by the holder, and a closed position, where a curved central portion of the clamp is aligned with the handle depression, forming a handle ligature in which the gun handle is secured.

A securement end of the handle clamp is secured to the body by a knob turned onto a threaded rod. The threaded rod is captured in the body so that it can pivot between an unsecuring position, where the rod extends out to the side of the body, and a securing position, where the rod extends out to the front of the body through a slot in the handle clamp. The knob is screwed down against the securement end, to clamp the gun handle in the handle ligature.

The shuttle slides longitudinally on the rail in a vertical rail slot on the back of the shuttle body and is secured to the rail by a rail clamp. The rail slot has a fixed side wall with a fixed groove that extends the full length of the side wall. The shape of the fixed groove mirrors the linear gear. Alternatively, the fixed side wall is flat with a slant to match a corresponding slant in the side edge of the rail.

The rail clamp reciprocates in the side of the shuttle body opposite the fixed side wall. A foot extends inwardly from the rail clamp body into the rail slot. The foot has a movable groove in a surface that forms a movable side wall of the rail slot opposite the fixed side wall. The shape of the movable groove mirrors the linear gear.

Extending into the movable groove from its nadir are one or more studs. The studs wedge between the teeth of the linear gear when the rail clamp is clamped onto the rail head.

The rail claim reciprocates between a disengaged position and an engaged position. A levered cam mechanism causes the rail clamp to reciprocate. A threaded rod extends through holes in the rail clamp and the shuttle body. The threaded rod is turned into a cylindrical nut that anchors the threaded rod in the shuttle body. A cylindrical head at the other end of the threaded rod is captured in a cam so that the cam can pivot approximately 90° about the head.

In one configuration, the cam is generally oval with a small radius and a large radius, and the cylindrical nut is captured in a hole in the center of the cam. A lever extends generally radially from the cam opposite the small radius.

In another configuration, the cam is round and the cylindrical head is captured in a hole that is offset from the center of the cam. The offset creates a small radius and a large radius. The lever extends generally radially from the cam opposite the small radius.

When the lever is extending away from the rail clamp, the small radius of the cam abuts the rail clamp and one or more springs push the rail clamp away from the rail to the disengaged position, thereby disengaging the studs from the linear gear and allowing the shuttle to reciprocate on the rail. When the lever is manually pivoted toward the rail clamp until the large radius of the cam abuts the rail clamp, the rail clamp is pressed against the rail against the force of the spring to the engaged position, thereby engaging the studs with the linear gear.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein:

FIG. 21 is a detail view of the rail teeth and rail clamp stud when not engaged;

FIG. 22 is a detail view of the rail teeth and rail clamp stud when engaged;

DETAILED DESCRIPTION OF THE INVENTION

The present application hereby incorporates by reference in its entirety U.S. Provisional Patent Application No. 63/202,752, on which this application is based.

Figure 1:
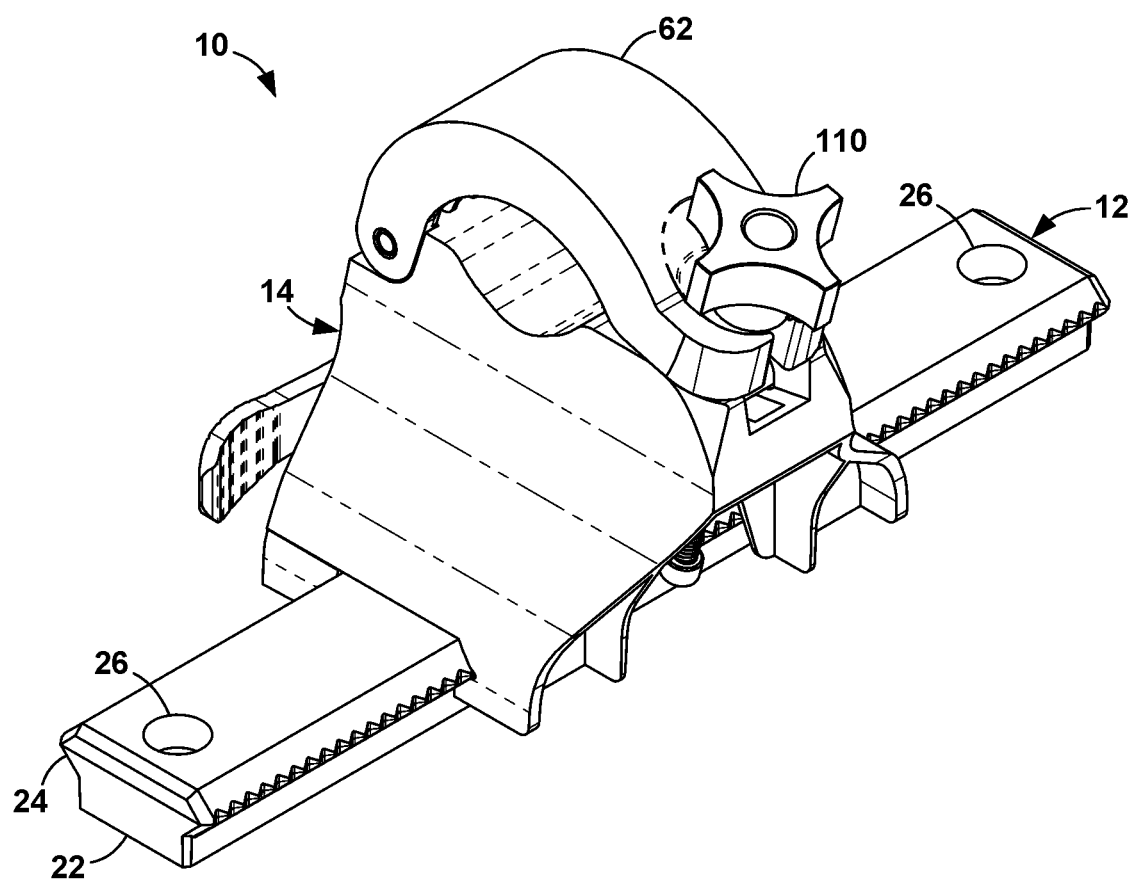
FIG. 1 is a perspective view of the massage gun holder of the present invention.
Figure 2:
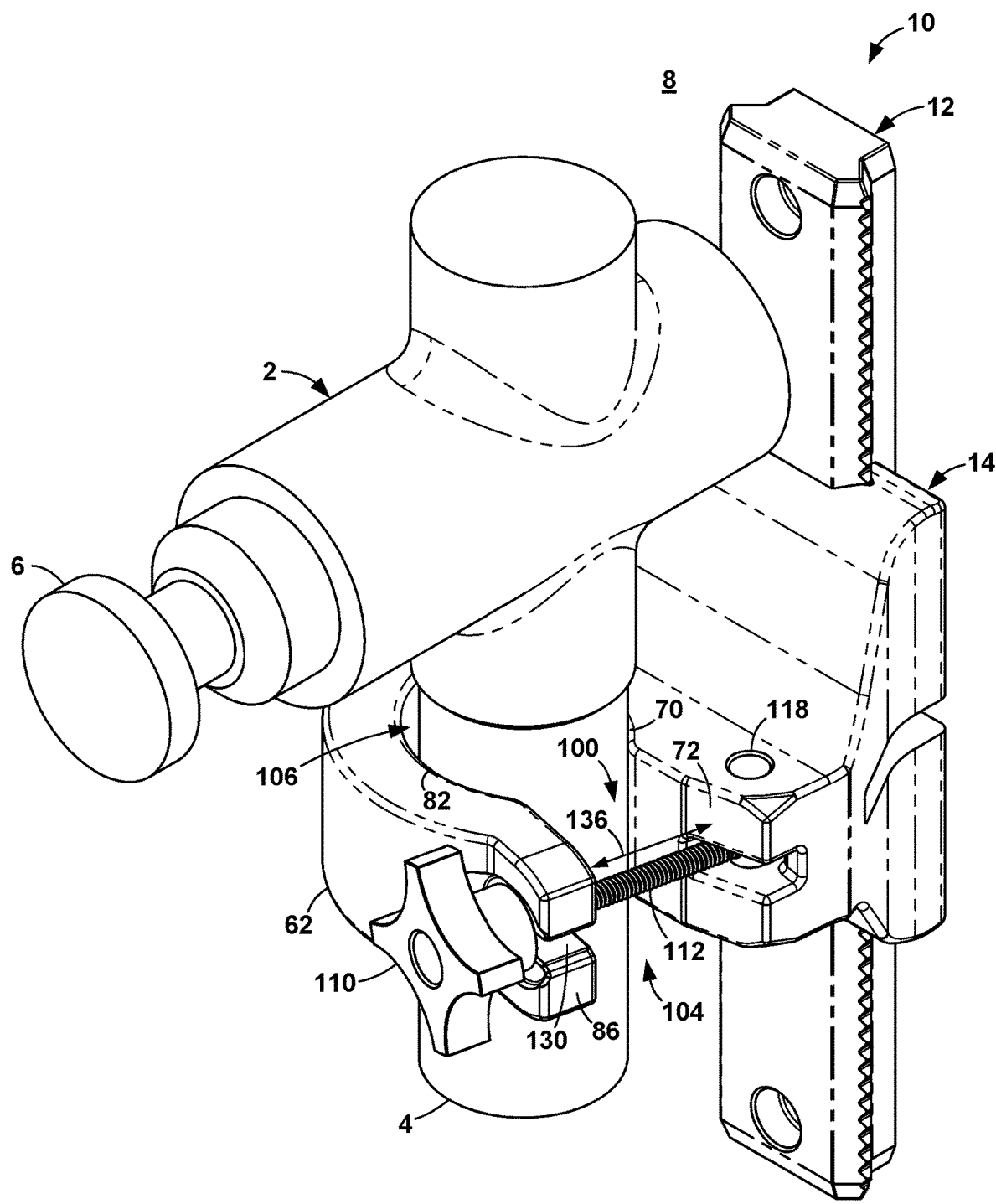
FIG. 2 is a perspective view of the massage gun holder with a massage gun.
Figure 3:
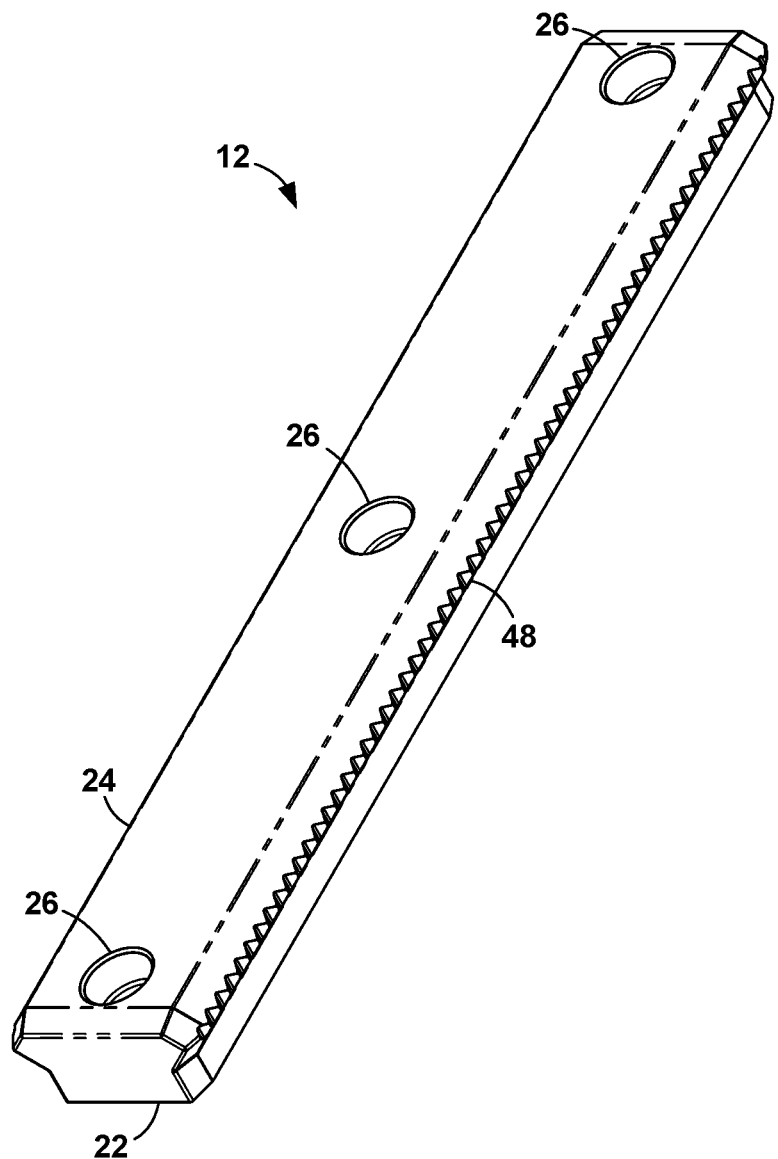
FIG. 3 is a perspective view of the rail.

As shown in FIGS. 1 and 2, the present invention is a massage gun holder 10 that holds a massage gun (or other similar device) 2 by the handle 4 in the correct position and orientation to apply the gun head 6 to locations on the user's body that he/she cannot easily reach. The massage gun holder 10 is comprised of an elongated rail 12 that attaches to a wall or other mounting surface 8, and a shuttle 14 that holds the gun 2 and that can move longitudinally on the rail 12.

The rail 12 can be any length but is preferably at least 12 inches long. The rail 12 can be mounted vertically, as in FIG. 2, horizontally, or any other orientation. The remainder of the present specification assumes that the rail 12 is mounted vertically. With this assumption, position terminology, such as front, back, top, bottom, side, vertical, and horizontal, is used relative to the orientation of FIG. 2. For example, the gun head 6 is pointing to the front.

The rail 12, shown in FIGS. 3-7, has a mushroom-shaped cross-section with a base 22 and a head 24. The base 22 raises the head 24 from the mounting surface 8.

The base 22 abuts and is secured to the mounting surface 8, typically by a number of screws 28 extending through mounting holes 26. The mounting holes 26 are recessed, as at 30, so that the screw heads 34 do not sit above the front surface 32 of the head 24 for reasons explained below. The number of mounting holes 26 depends on the length of the rail 12 and are fairly close together. In the illustrated configuration of FIG. 4 having a length of 12 inches, there are three mounting holes 26 with a spacing of approximately 5.375 inches. In the illustrated configurations of FIG. 5 having a length of 12 inches, there are four mounting holes 26 with a spacing of approximately 3.5 inches. The reason for the relatively close spacing is that, when the massage gun 2 is operating, it puts a significant amount of vibrational stress on the holder 10. The more screws 28 there are securing the rail 12 to the mounting surface 8, the more stable the holder 10 will be and will be less likely to detach from the mounting surface 8.

Figure 7:
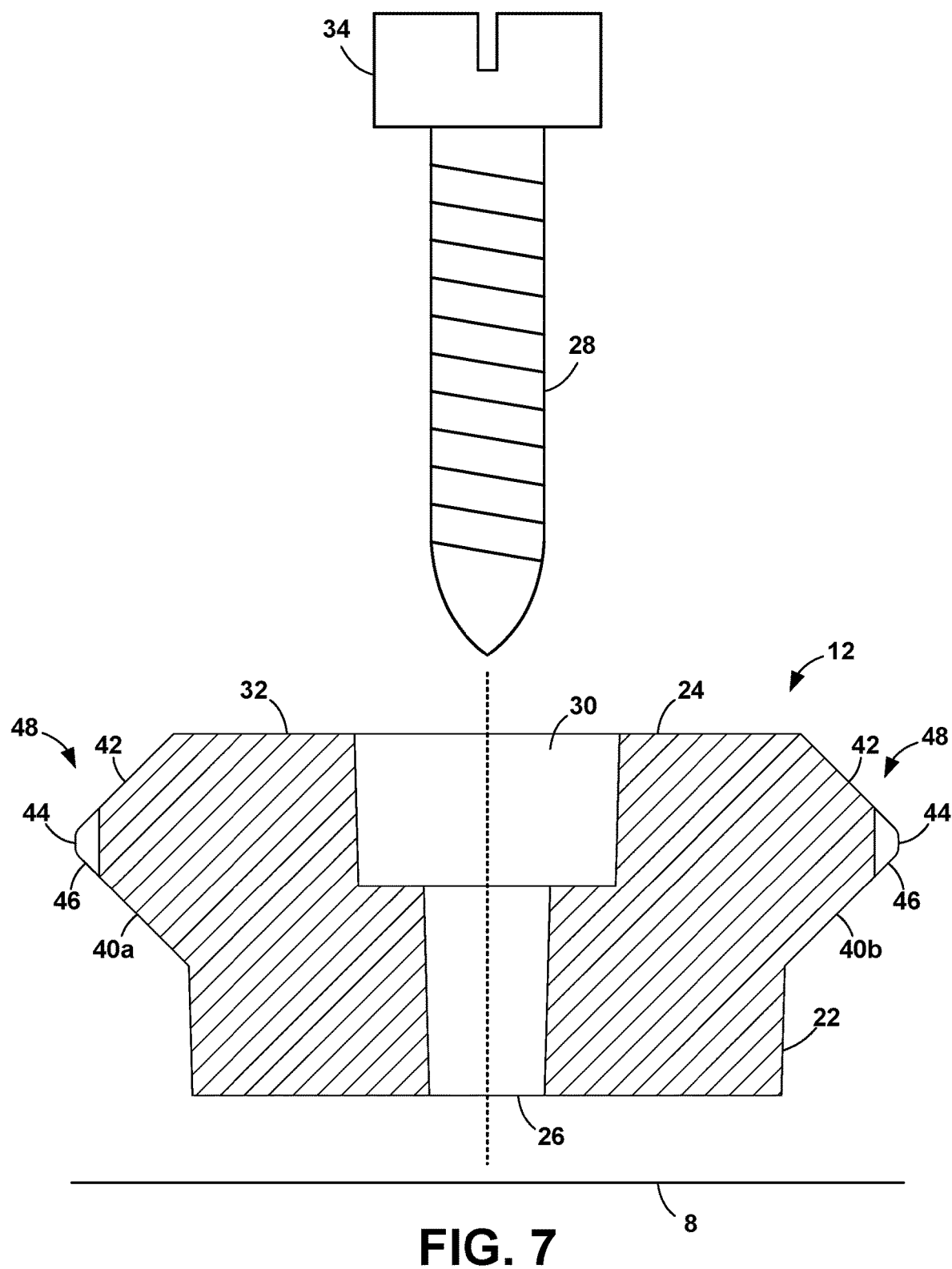
FIG. 7 is a cross-sectional view of the rail taken at A-A with a screw.

As seen in FIG. 7, each longitudinal side edge 40a, 40b (collectively, 40) of the head 24 tapers from the front surface 32 of the head 24 and from the base 22 to a blunt apex 44, as at 42. In the illustrated configuration, each edge 40 tapers at an angle of about 45°, so that the angle of the apex 44 is approximately 90°. The apex 44 is cut into a series of teeth 46 that forms a linear gear 48 extending nearly the full length of the rail 12. The tooth pitch 50, shown in FIG. 21, determines how precisely the shuttle 14 can be positioned, as described below. The larger the pitch, the less precise positioning will be. In the present configuration, the tooth pitch 50 is 0.2 inches.

Figure 4:
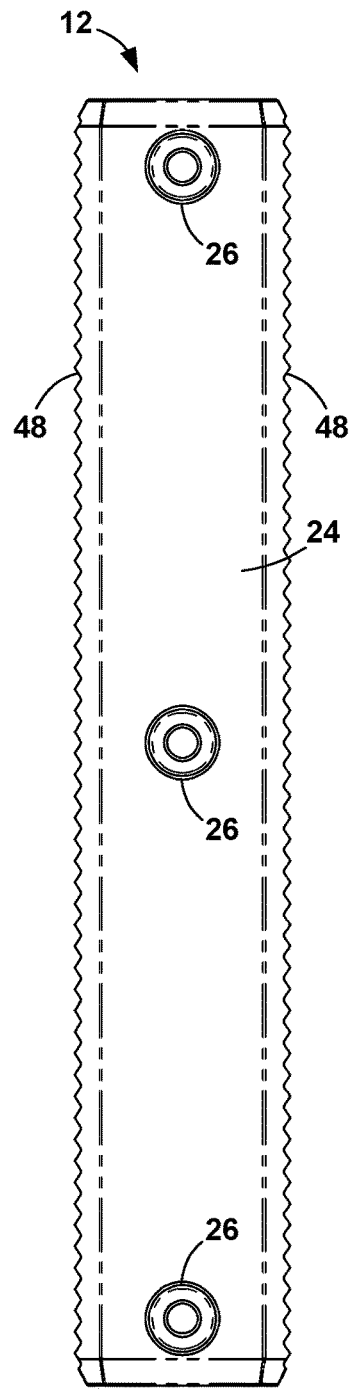
FIG. 4 is a front view of one configuration of the rail.
Figure 5:
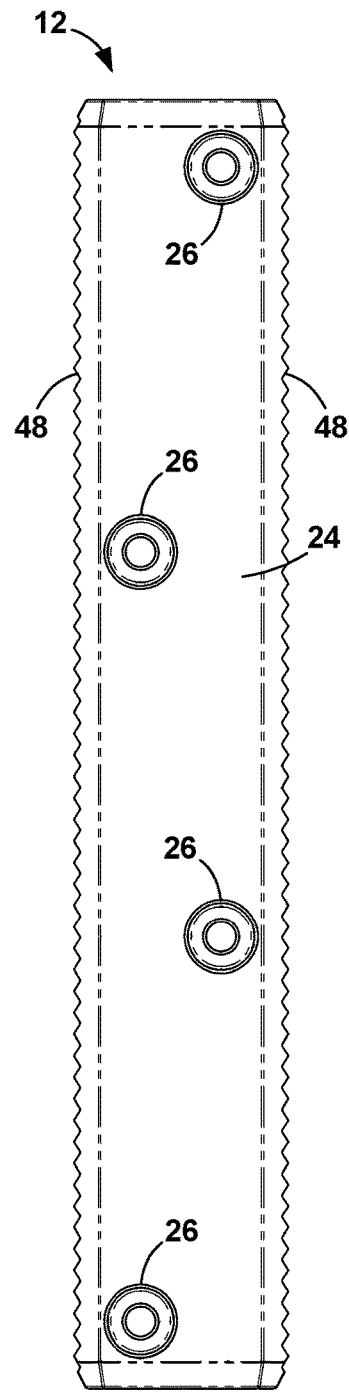
FIG. 5 is a front view of another configuration of the rail.
Figure 6:
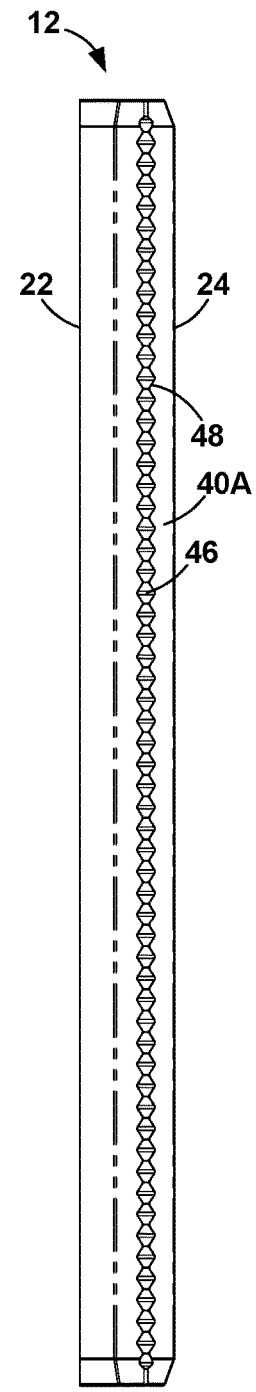
FIG. 6 is a side view of the rail of FIG. 3.
Figure 8:
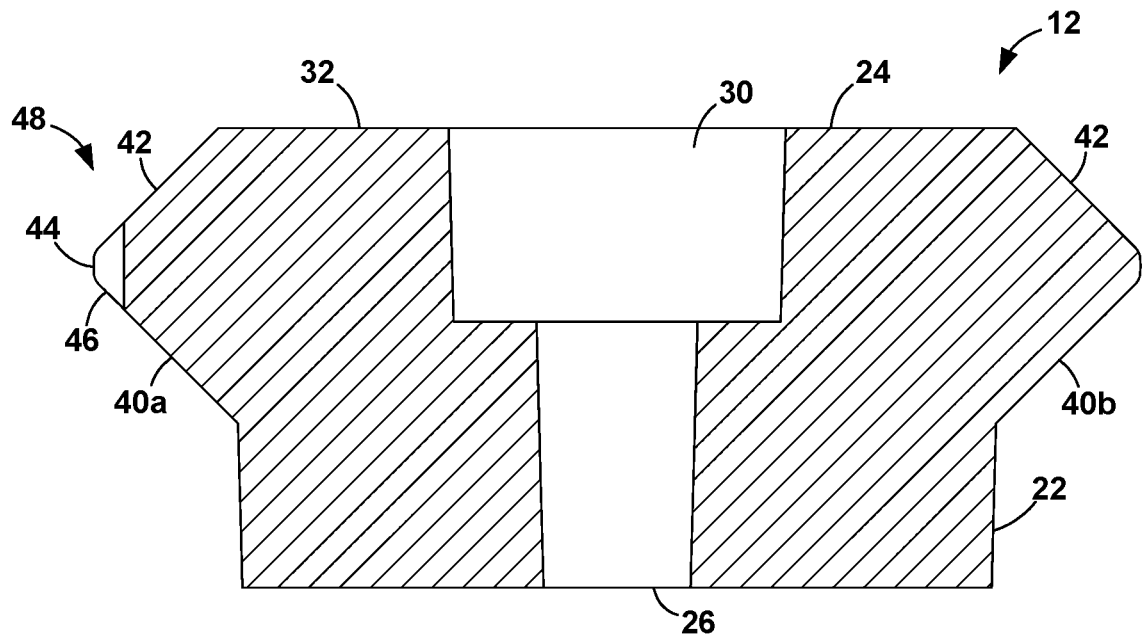
FIG. 8 is a cross-sectional view of an alternative configuration of the rail.

In the configuration of FIGS. 4, 5, and 7, both side edges 40 have linear gears 48. In another configuration, shown in FIG. 8, only one side edge 40a has a linear gear 48, and the other side edge 40b is tapered but without teeth 46, as at 42. In another configuration, shown in FIG. 9, only one side edge 40a has a linear gear 48, and the other side edge 40b is flat and at a slant, as at 58. For the non-symmetrical configurations, the side edges 40 can be reversed from that of FIGS. 8 and 9.

The shuttle 14 rides on the rail 12 and can be secured to any desired position along the rail 12 as precisely as the tooth pitch 50 permits. The shuttle 14 has three main parts, a body 60, a handle clamp 62, and a rail clamp 64.

The body 60 has a curved depression 70 in the front surface 72 for the gun handle 4, as shown in FIGS. 10-13. The depression 70 extends vertically from top 74 to bottom 76. The width 78 of the depression 70 is sized to securely hold the gun handle 4 for massage gun handles of various sizes. To that end, the curve of the depression 70 is generally rounded with a radius in the range of from about 0.5 inch to 1 inch and extends over an arc in the range of from 100° to 160°. In the illustrated configuration, the curve of the depression 70 has a radius of approximately 0.65 inch and extends over an arc of approximately 130°.

The handle clamp 62, shown in FIGS. 10-13, secures the massage gun handle 4 in the depression 70. The handle clamp 62 has a curved central portion 82 with a pivot end 84 and a securement end 86.

The handle clamp 62 pivots relative to the body 60 on a clamp hinge 90. In one configuration of the clamp hinge 90, shown in FIG. 10, fingers 91 extending longitudinally from the pivot end 84 fit into notches 92 in the front surface 72 of the body 60. A lateral through hole 93 in the pivot end 84 aligns with a pair of through holes 94 in the fingers 91. A pin 95 extends through the holes 93, 94 to provide an axle about which the handle clamp 62 pivots.

Figure 11:
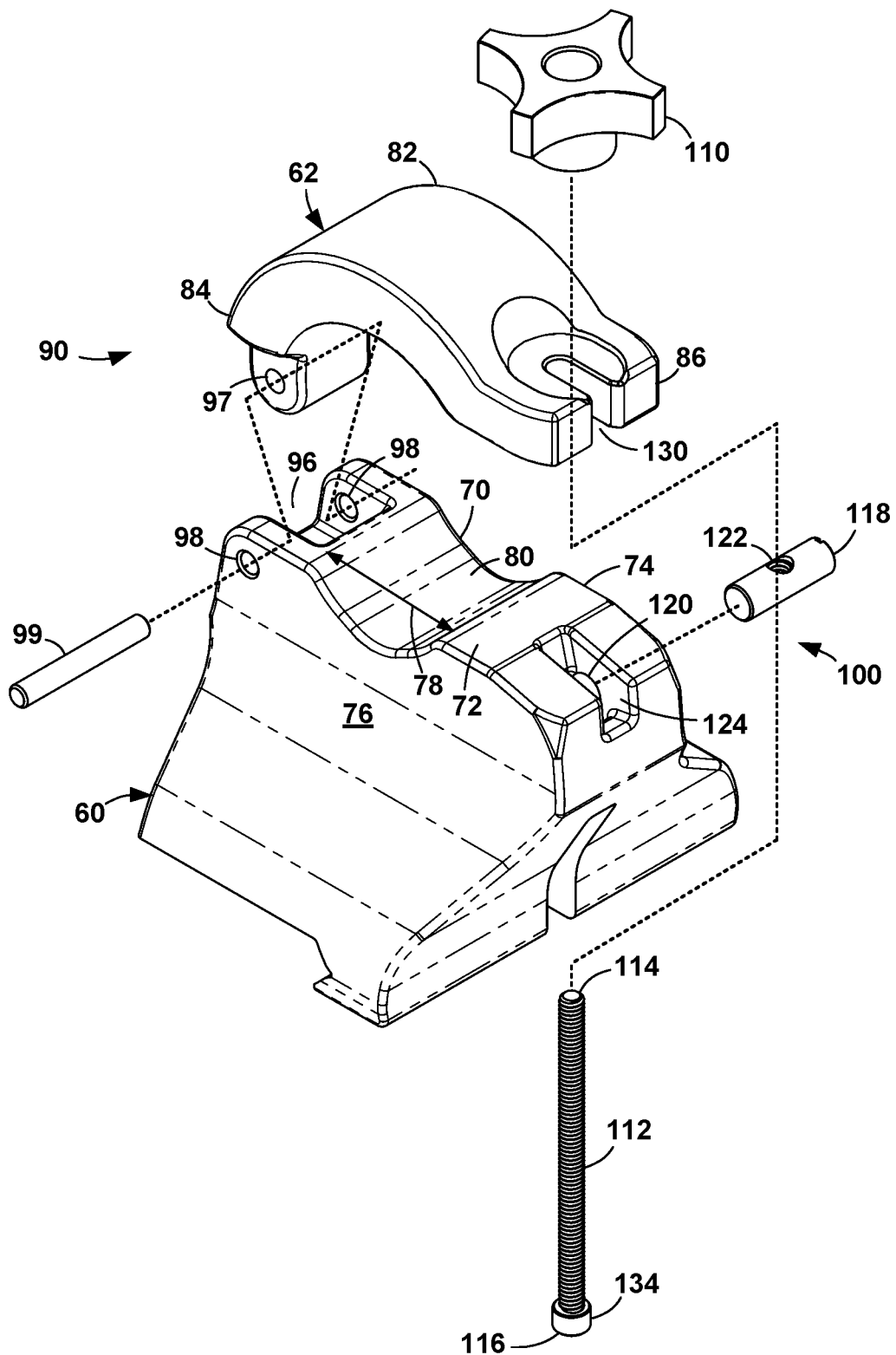
FIG. 11 is an exploded, perspective view of the shuttle body and handle clamp with another configuration of the clamp hinge.

In another configuration of the clamp hinge 90, shown in FIG. 11, the pivot end 84 fits into a notch 96 in the front surface 72 of the body 60. A lateral through hole 97 in the pivot end 84 aligns with a pair of through holes 98 in the sides of the body notch 96. A pin 99 extends through the holes 97, 98 to provide an axle about which the handle clamp 62 pivots.

Figure 12:
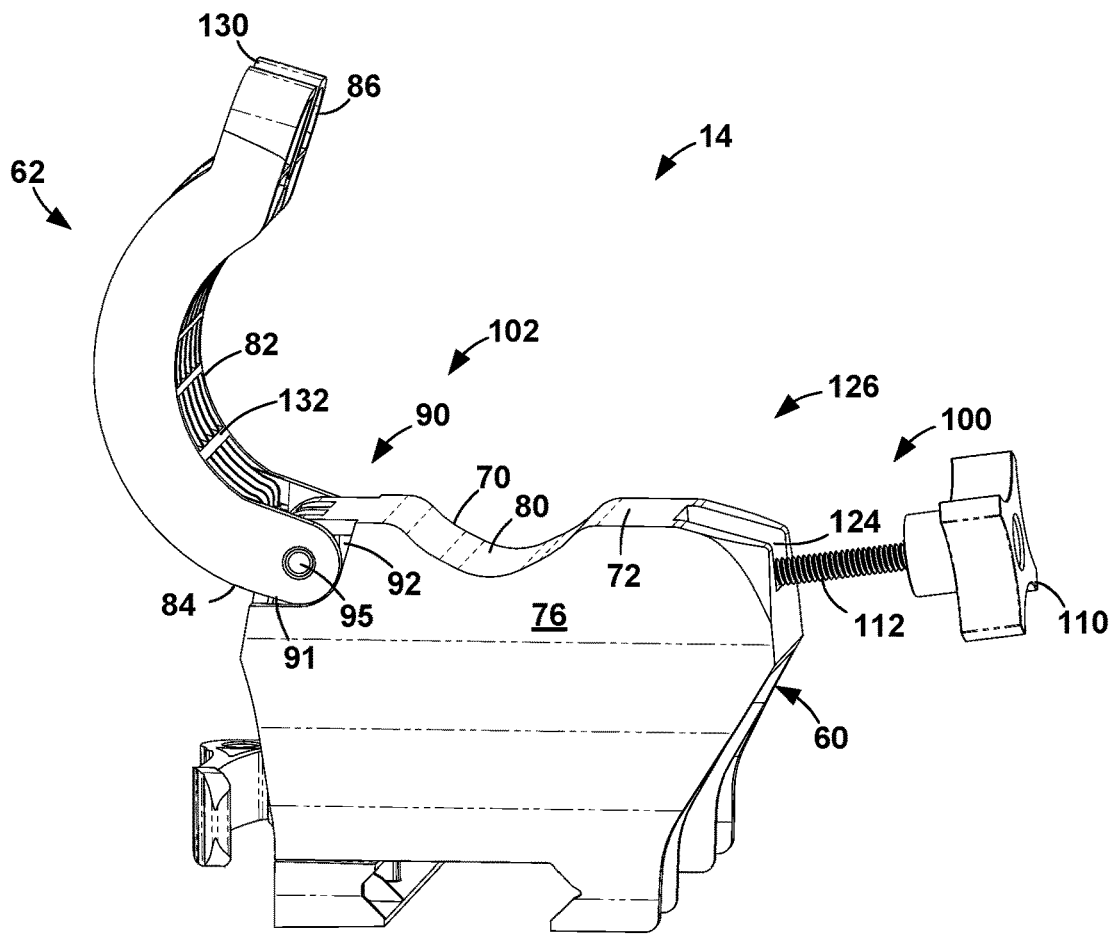
FIG. 12 is a perspective view of the shuttle with the handle clamp in the open position and the threaded rod in the unsecured position.
Figure 13:
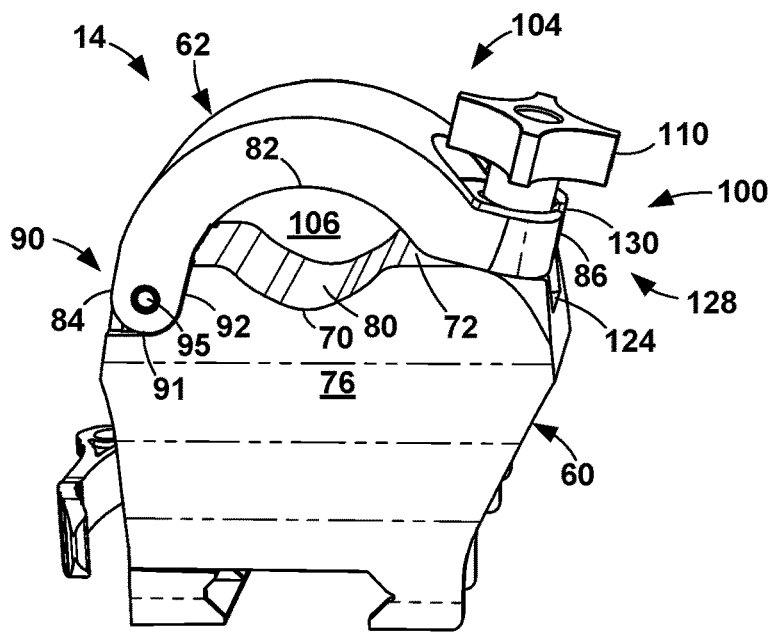
FIG. 13 is a perspective view of the shuttle with the handle clamp in the closed position and the threaded rod in the secured position.

The handle clamp 62 pivots on the clamp hinge 90 between an open position, as at 102 in FIG. 12, and a closed position, as at 104 in FIGS. 2 and 13. In the open position 102, the massage gun 2 is not secured by the holder 10. In the closed position 104, the clamp curved central portion 82 is aligned with the handle depression 70 in the body 60, forming a handle ligature 106. The massage gun handle 4 is secured in the handle ligature 106, as in FIG. 2.

The central portion 82 is generally rounded with a radius that is greater than the radius of the depression 70. The larger radius permits the massage gun holder 10 to accommodate a wide range of handle sizes. In the present configuration, the radius in the range of from about 1.0 inch to 1.75 inches and extends over an arc in the range of from 100° to 160°. In the illustrated configuration, the central portion 82 has a radius of approximately 1.38 inch and extends over an arc of approximately 130°.

A handle clamp securement 100 secures the securement end 86 of the handle clamp 62 to the shuttle body 60. The handle clamp securement 100 includes a knob 110 turned onto a free end 114 of a threaded rod 112. A captured end 116 of the rod 112 is captured in the body 60. A pin 118 fits in a hole 120 in the body 60 so that it can pivot. The captured end 116 of the rod 112 is turned into a threaded radial hole 122 in the pin 118 until a head 134 at the captured end 116 abuts the pin 118. The rod 112 extends outside the body 60 through a slot 124 that permits the rod 112 to pivot with the pin 118 through about 90° between an unsecuring position, where the rod 112 extends out to the side of the body 60, as at 126 in FIG. 12, and a securing position, where the rod 112 extends out to the front of the body 60, as at 128 in FIG. 13. When moving to the securing position 128, the rod 112 pivots into a slot 130 in the securement end 86 of the handle clamp 62, after which the knob 110 is screwed down against the securement end 86. When the handle clamp 62 is secured by the knob 110, the gun handle 4 is securely clamped in the handle ligature 106.

The massage gun holder 10 is designed to accommodate a wide range of massage guns 2 having handles 4 of different diameters. The accommodation is due, in part, to the size of the depression 70 and handle clamp central portion 82. This is also due to the design of the handle clamp securement 100. The knob 110 is tightened down on the threaded rod 112 enough to securely clamp the massage gun handle 4. This will leave a gap 136 between the securement end 86 and the front 72 of the body 60, the size of which will be determined by the size of the handle 4. The larger the handle 4, the larger the gap 136.

Optionally, the depression surface 80 and/or the handle clamp clamping surface 132 are textured in some manner to aid in securing the gun handle 4. Texturing can take the form of knurling, a rubber sheet, or other structure that can grip the gun handle 4.

The shuttle 14 slides longitudinally on the rail 12 in a vertical rail slot 142 on the back 140 of the shuttle body 60. The screw heads 34 are recessed, as described above, so that they do not interfere with the shuttle 14 sliding on the rail 12. Alternatively, not shown, the front wall 148 of the rail slot 142 can have a vertical groove wide and deep enough for the screw heads 34.

The shuttle 14 is secured to the rail 12 by a rail clamp 64. As described above, the back surface 140 of the body 60 has a rail slot 142 into which the rail 12 fits.

Figure 14:
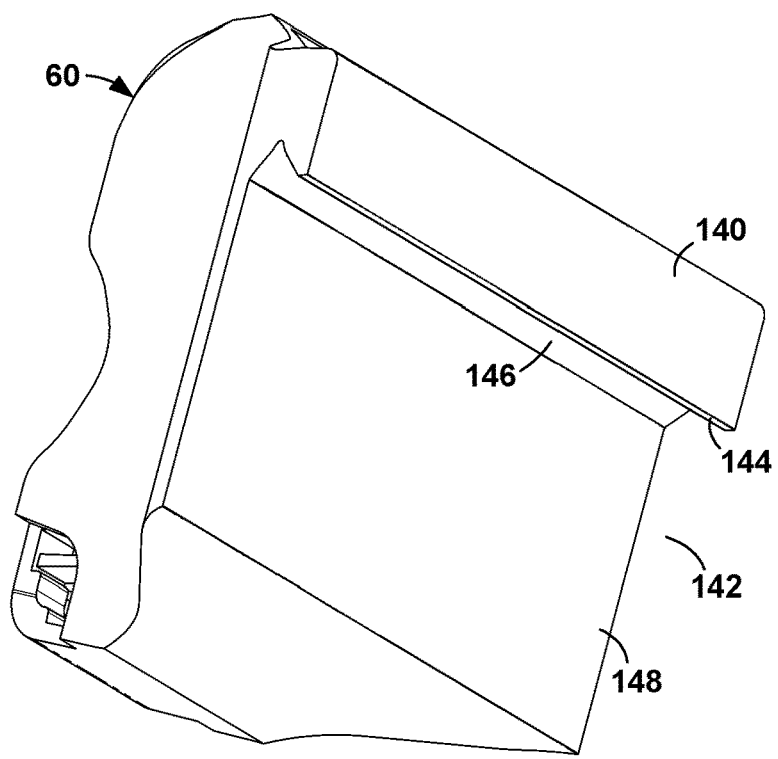
FIG. 14 is a back, perspective view of the shuttle body.
Figure 15:
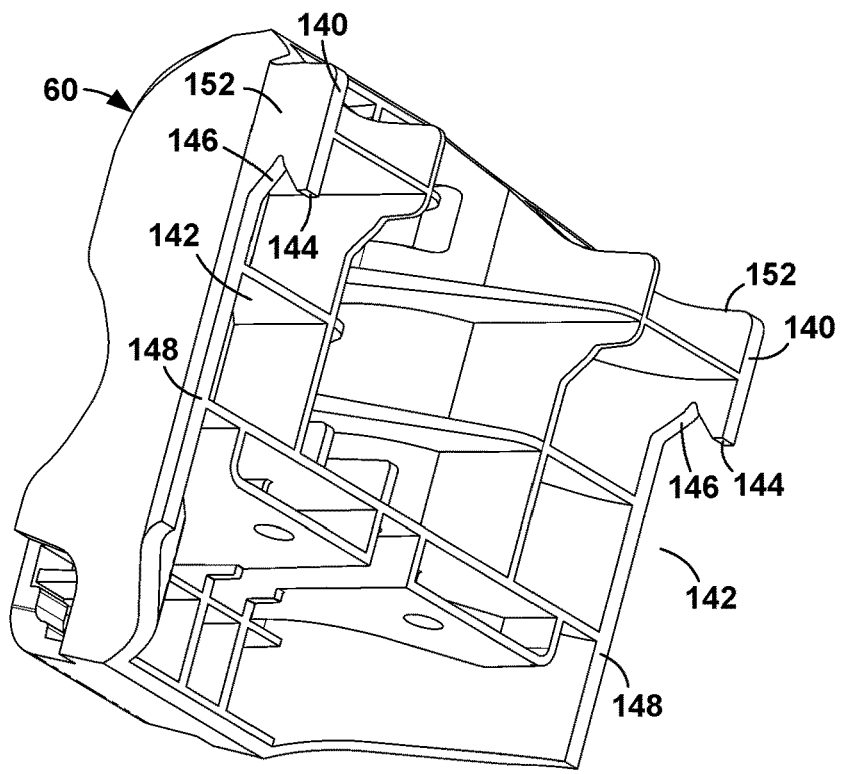
FIG. 15 is a back, perspective view of an alternate configuration of the shuttle body.

As shown in FIGS. 14 and 15, the rail slot 142 has a vertical fixed side wall 144 with a vertical fixed groove 146 that extends the full length of the fixed side wall 144. The shape of the fixed groove 146 mirrors and complements the tapered edge 42 and apex 44 of the rail head 24. In one configuration, the fixed side wall 144 and the fixed groove 146 are continuous over the length of the shuttle body 60, as in FIG. 14. In another configuration, fixed side wall 144 and the fixed groove 146 are formed in the sides 152 of the body 60, as in FIG. 15. Relative to the elongated linear gear 48, both configurations operate the same.

Figure 9:
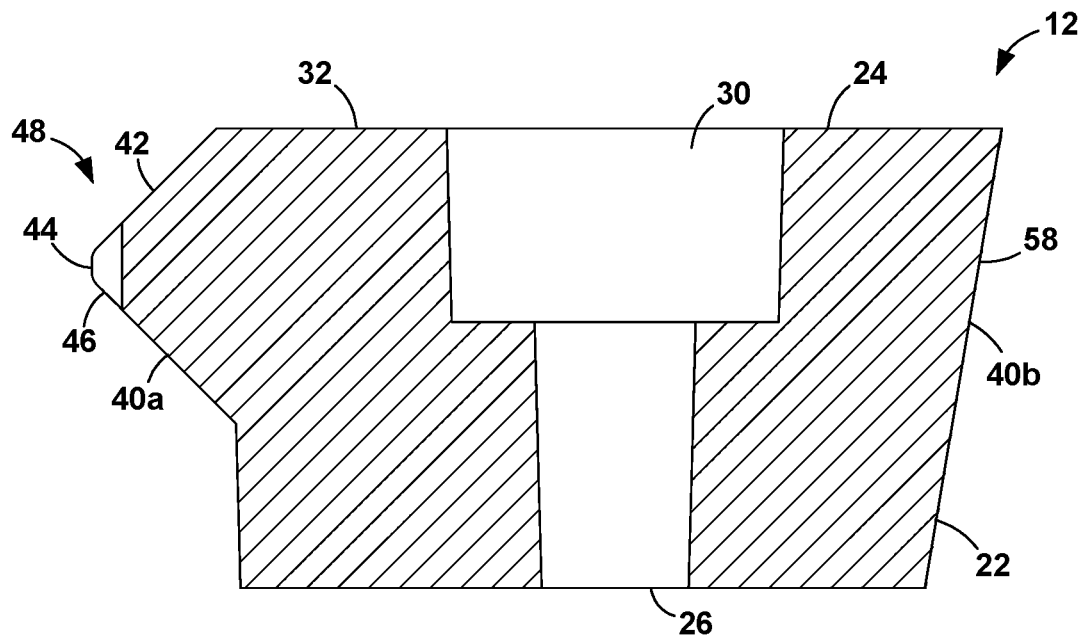
FIG. 9 is a cross-sectional view of another alternative configuration of the rail.
Figure 10:
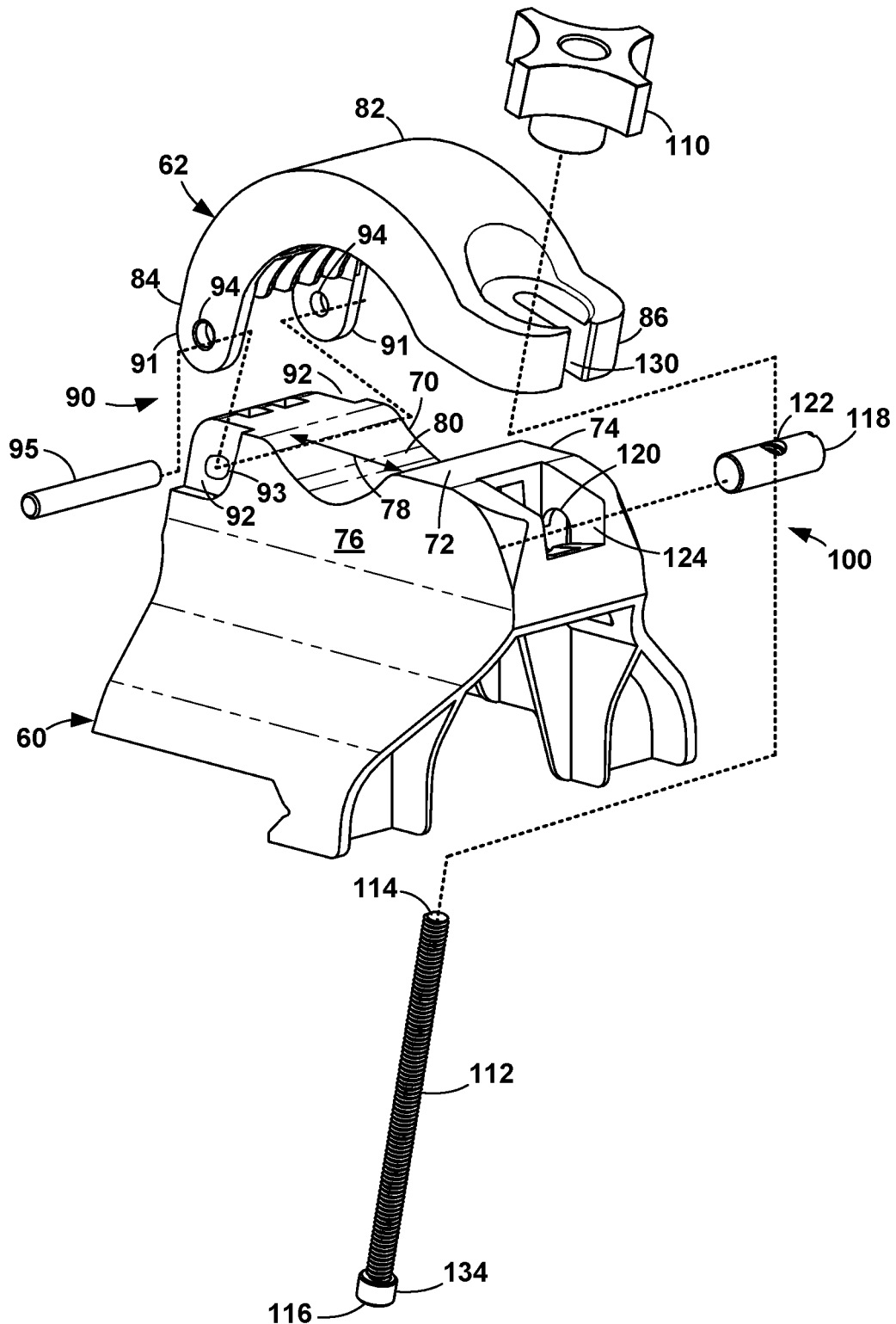
FIG. 10 is an exploded, perspective view of the shuttle body and handle clamp.
Figure 16:
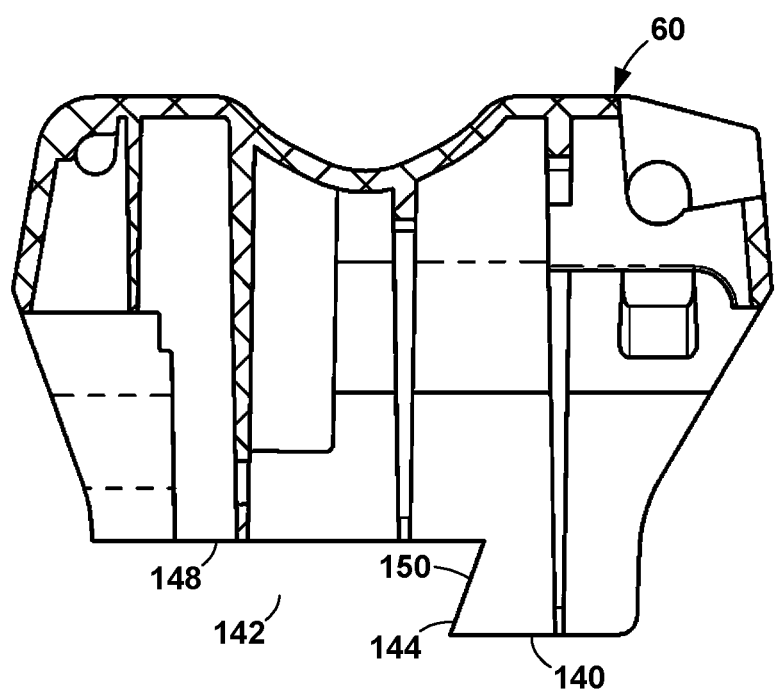
FIG. 16 is a side view of the shuttle body with an alternate rail slot side wall.

The present invention also contemplates that the fixed side wall 144 is flat with a slant, as 150 in FIG. 16, to match the corresponding slant 58 in the side edge 40b of the rail 12 of FIG. 9.

Figure 17:
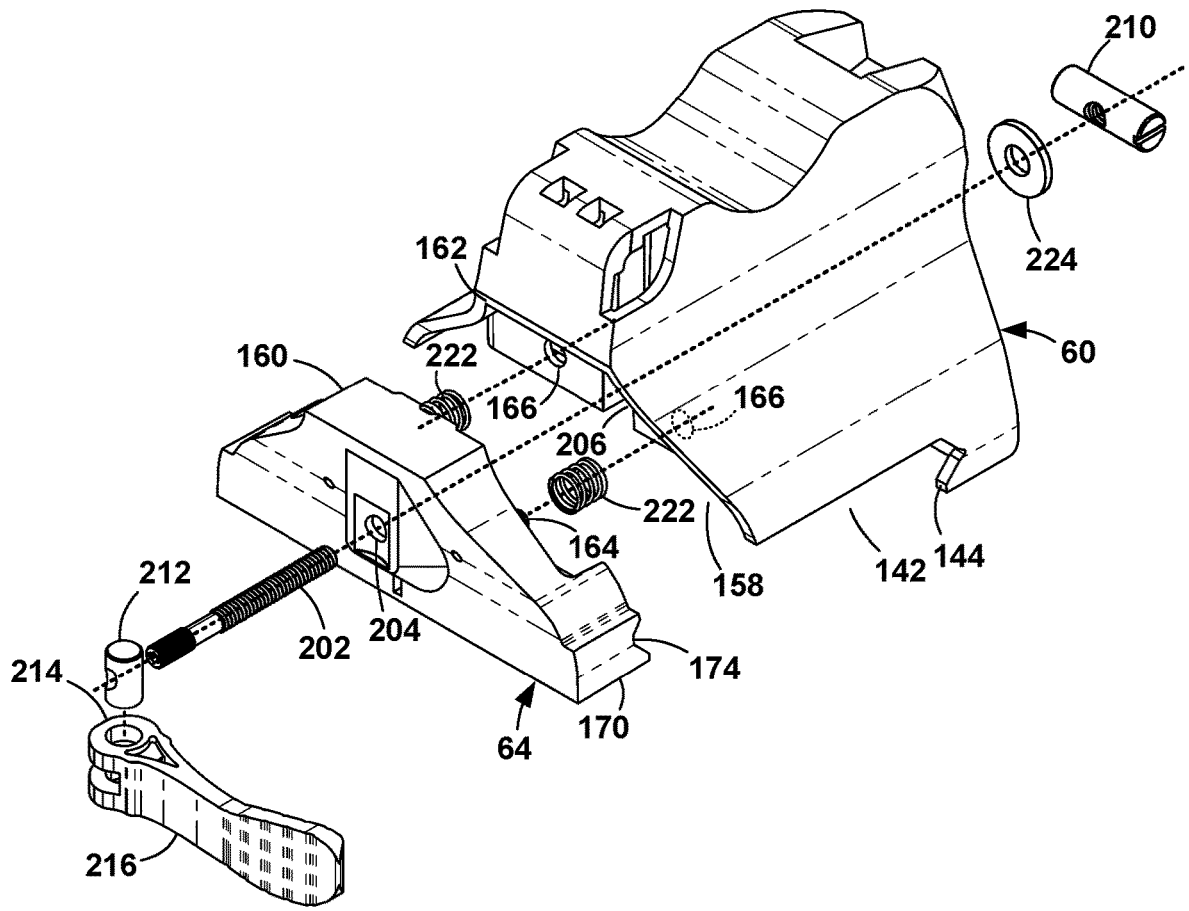
FIG. 17 is an exploded, perspective view of the shuttle body and rail clamp.
Figure 18:
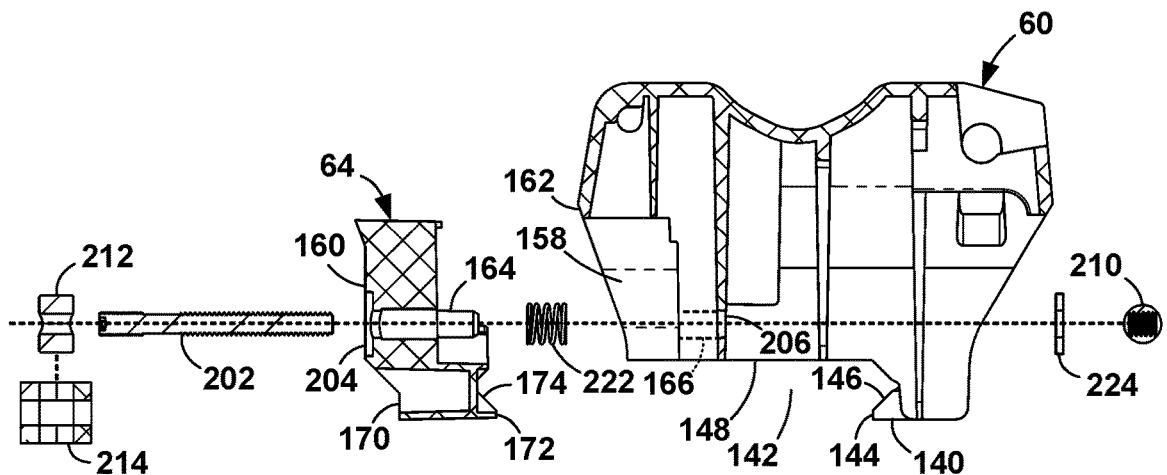
FIG. 18 is an exploded, side, cross-sectional view of the shuttle body and rail clamp.

As shown in FIGS. 17 and 18, the body 160 of the rail clamp 64 reciprocates in an opening 158 on the side 162 of the shuttle body 60 opposite the fixed side wall 144. A pair of pins 164 on the rail clamp body 160 fit into corresponding holes 166 in the opening 158 to guide the rail clamp 64. Optionally, the pins 164 are separate components that are installed on the clamp body 160 by, for example, adhesive or press fit into holes.

Figure 19:
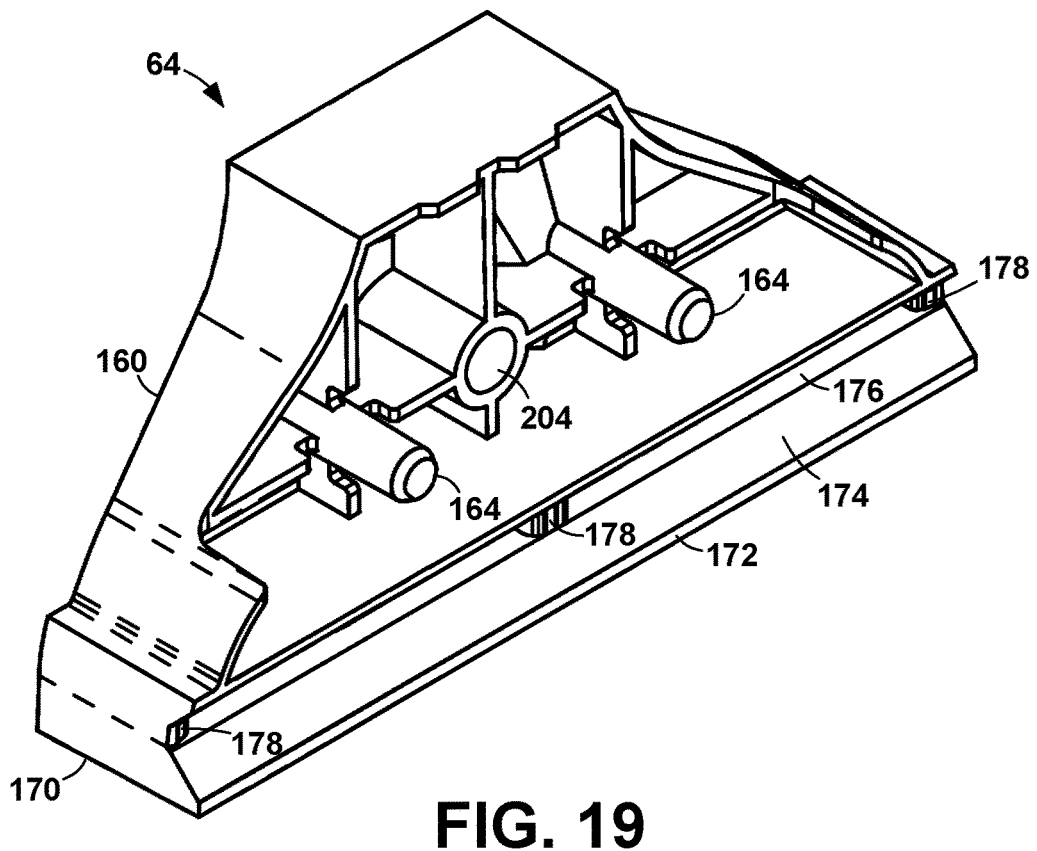
FIG. 19 is an inside perspective view of the rail clamp.
Figure 20:
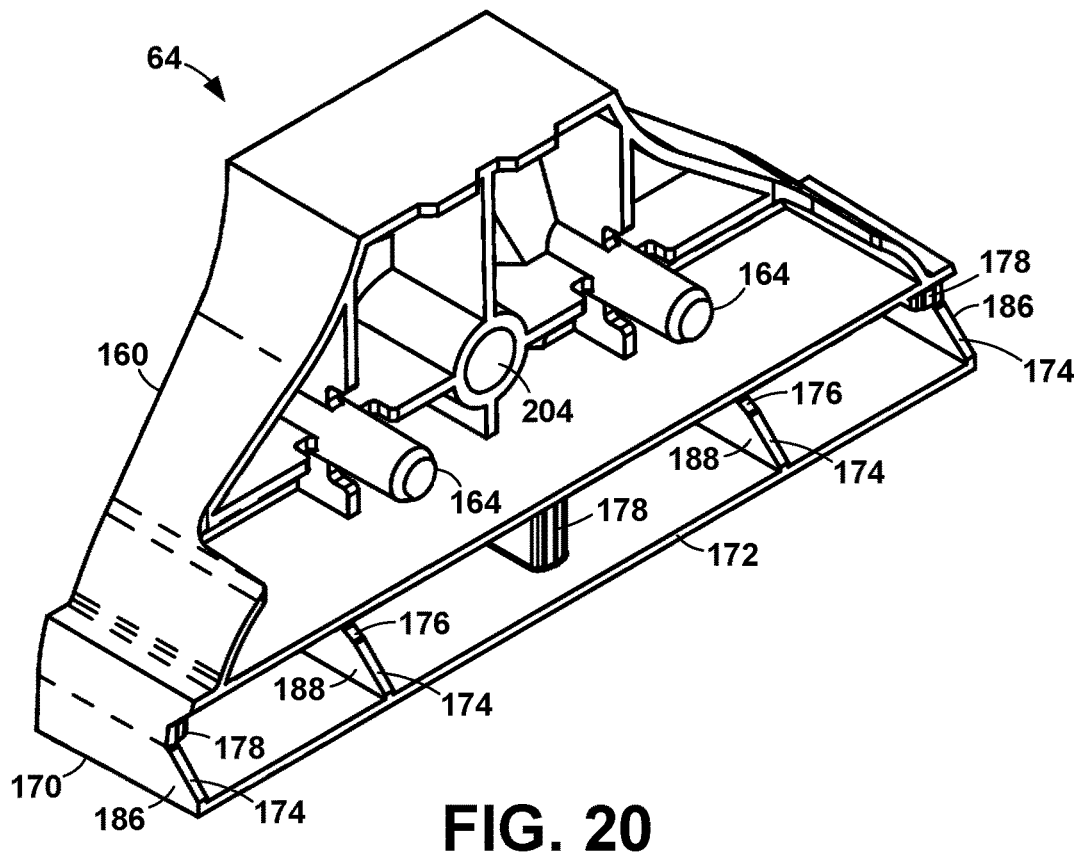
FIG. 20 is an inside perspective view of another configuration of the rail clamp.

Shown in FIGS. 19 and 20, the rail clamp 64 has a foot 170 that extends inwardly from the body 160 into the rail slot 142. The foot 170 has a vertical movable groove 174 in a surface that forms a movable side wall 172 of the rail slot 142 opposite the fixed side wall 144 of the rail slot 142. The movable groove 174 extends the full length of the movable side wall 172. The shape of the movable groove 174 mirrors and complements the tapered edge 40 and apex 44 of the rail head 24. In one configuration, the movable groove 174 is continuous over the length of the rail clamp foot 170, as in FIG. 19. In another configuration, the movable groove 174 is formed by the sides 186 of the rail clamp 64 and spaced wafers 188, as in FIG. 20. The movable groove 174 is formed in the sides 186 and wafers 188. As with the fixed side wall 144 and fixed groove 146 of FIG. 15, relative to the elongated linear gear 48, both configurations operate the same.

Extending into the movable groove 174 from the nadir 176 of the movable groove 174 are one or more spaced studs 178. In the illustrated configuration, shown in FIGS. 19 and 20, there are three studs 178, one in the center of the movable groove 174 and one at each end of the movable groove 174. The present invention contemplates that there may be any number of studs 178. The studs 178 are designed to wedge between the teeth 46 of the linear gear 48 of the rail head 24 when the rail clamp 64 is clamped onto the rail head 24, as described below. As shown in FIG. 21, the stud 178 has nearly the same width 180 as the tooth pitch 50. The stud 178, rather than having flat surfaces 54 like that of the teeth 46, has a curved surface 184 so that the stud 178 more easily self-aligns between the teeth 46 when clamped against the rail head 24. Because of the shape and height difference between the stud 178 and teeth 46, the stud 178 does not fill the valley 56 between the teeth 46, as shown in FIG. 22. In the illustrated design, the teeth 46 are approximately 0.057 inches in height and studs 178 are approximately 0.08 inches in height, as at 182, and the tooth pitch 50 and the stud width 180 are about 0.2 inches. The studs 178 are spaced apart by a multiple of the tooth pitch 50 so that all of the studs 178 are properly engaged with the linear gear 48.

Figure 23:
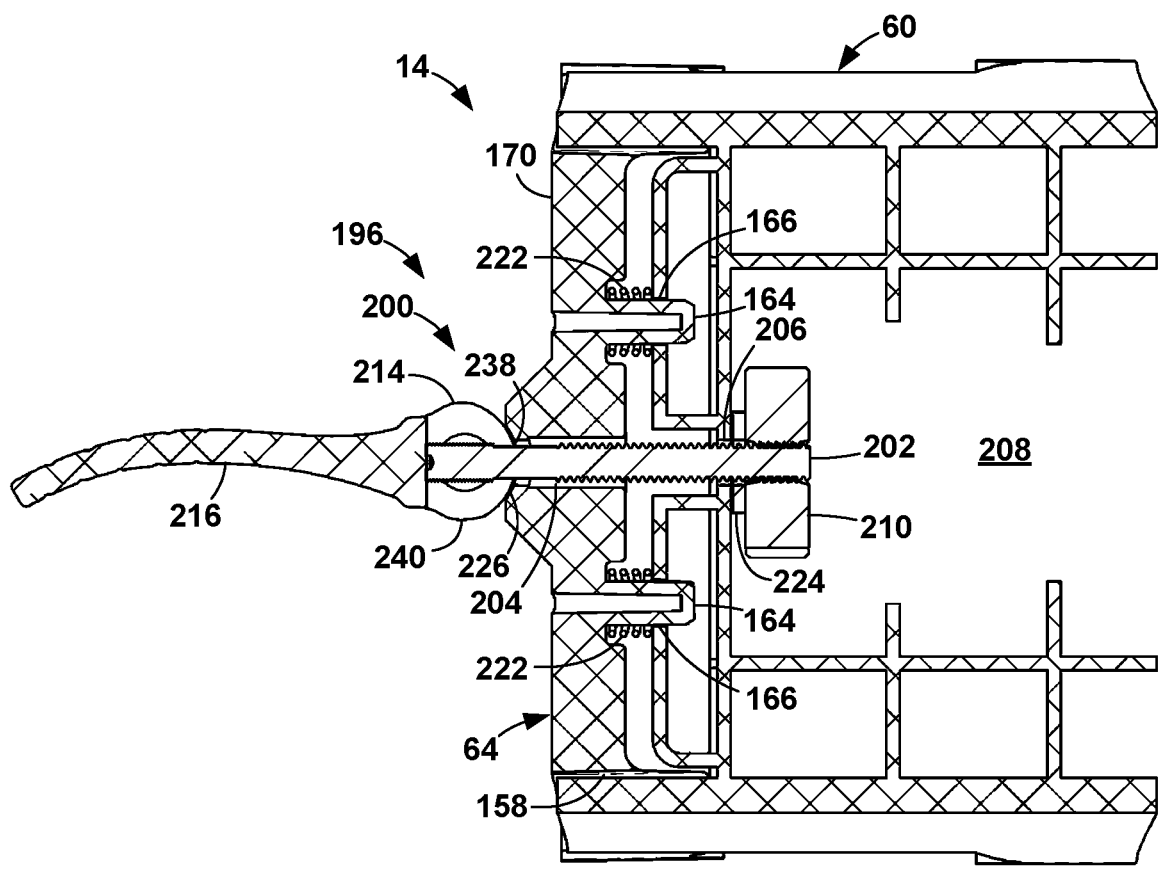
FIG. 23 is a front, cross-sectional view of the rail clamp when unengaged.
Figure 24:
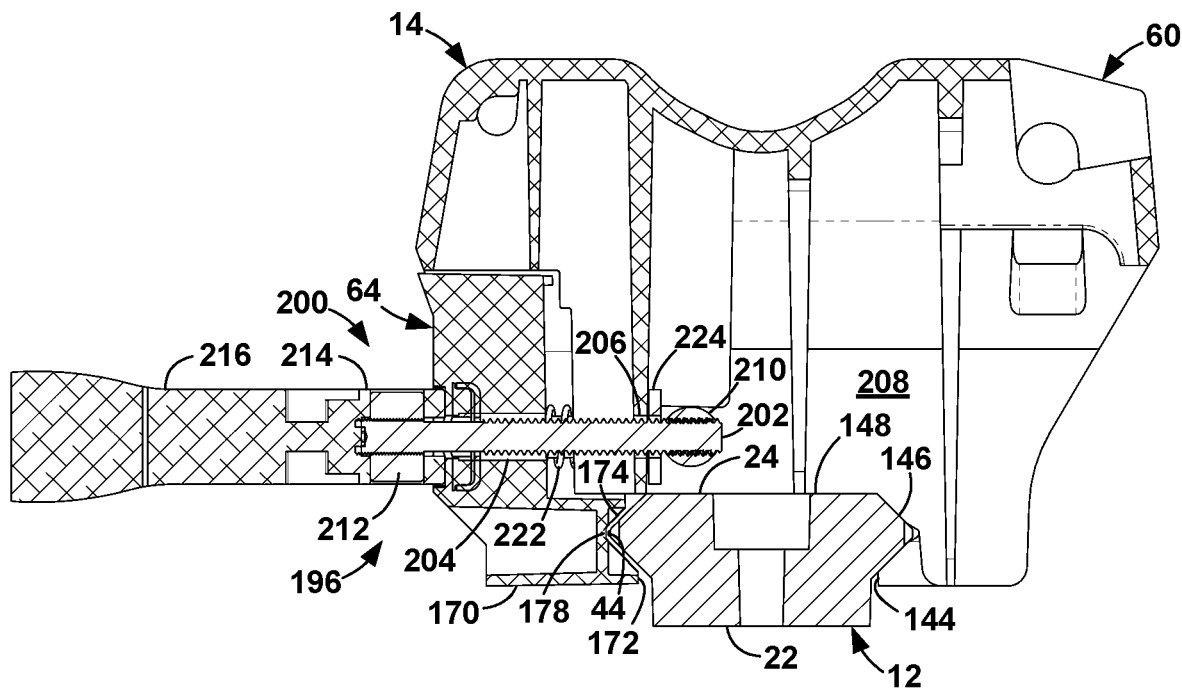
FIG. 24 is a bottom, cross-sectional view of the rail clamp when unengaged.
Figure 25:
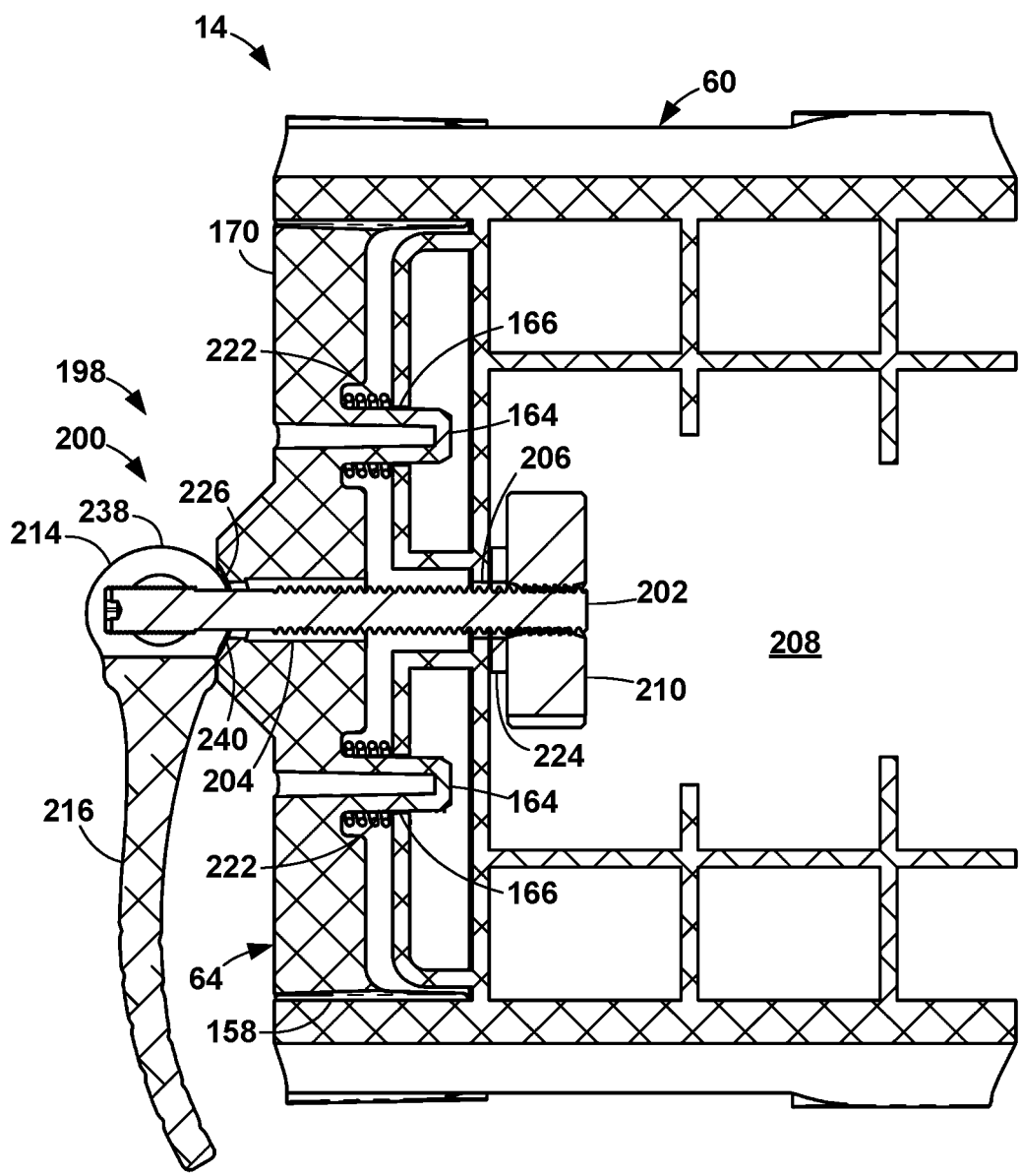
FIG. 25 is a front, cross-sectional view of the rail clamp when engaged.
Figure 26:
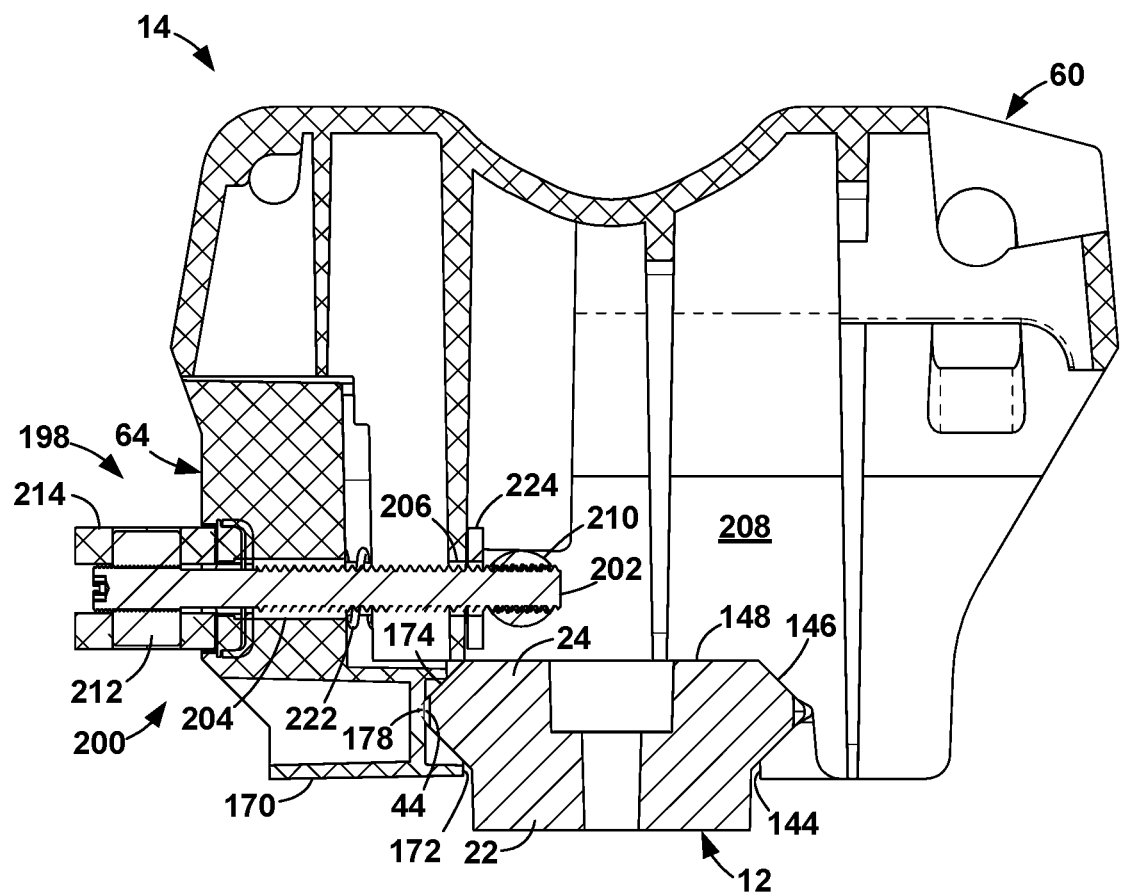
FIG. 26 is a bottom, cross-sectional view of the rail clamp when engaged.

The rail clamp 64 reciprocates in the opening 158 between a disengaged position 196, shown in FIGS. 23 and 24, and an engaged position, shown in FIGS. 25 and 26. A levered cam mechanism 200 causes the rail clamp 64 to reciprocate. A threaded rod 202 extends through a hole 204 in the rail clamp body 160 and an aligned hole 206 in the shuttle body 60. The shuttle body hole 206 extends from the opening 158 into a hollow 208 within the shuttle body 60. The hollow 208 is accessible through the front wall 148 of the rail slot 142. The threaded rod 202 is turned into a cylindrical nut 210 residing within the hollow 208 that anchors the threaded rod 202 in the shuttle body 60.

Optionally, the nut 210 is a lock nut so that it does not move on the rod 202 to loosen or tighten further. Optionally, a washer 224 is installed in the rod 208 before the cylindrical nut 210. A cylindrical head 212 at the other end of the threaded rod 202 is captured in a hole 230 in the cam 214 so that the cam 214 can pivot approximately 90° about the head 212. In one configuration, the cylindrical head 212 is an integral element of the threaded rod 202. In another configuration, shown in FIGS. 17 and 18, the cylindrical head 212 is a cylindrical nut. The end of the threaded rod 202 is turned on to cylindrical nut after the cylindrical nut is installed in the hole 230 in the cam 214.

Figure 27:
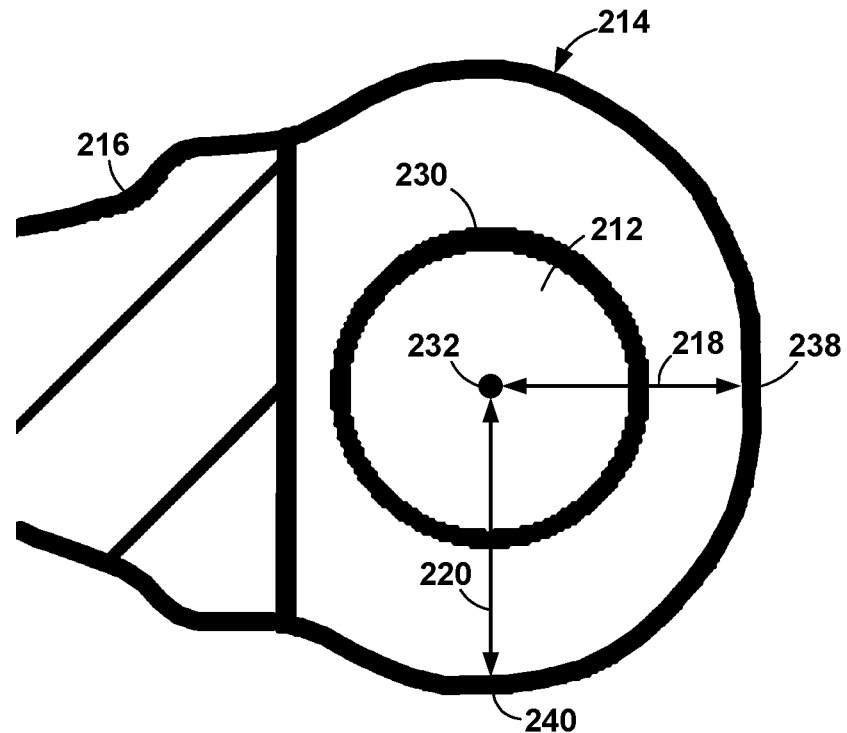
FIG. 27 is a cross-sectional view of one configuration of the cam.

The present invention contemplates at least two configurations for the cam 214. In the first configuration, shown in FIG. 27, the cam 214 is generally oval with a small radius 218 and a large radius 220, and the cylindrical head 212 is captured in the hole 230 in the center of the cam 214. A lever 216 extends generally radially from the cam 214 opposite the small radius 218 from the hole center 232. The large radius 220 from the hole center 232 is approximately 90° from the small radius 218 in the direction that the cam 214 pivots.

Figure 28:
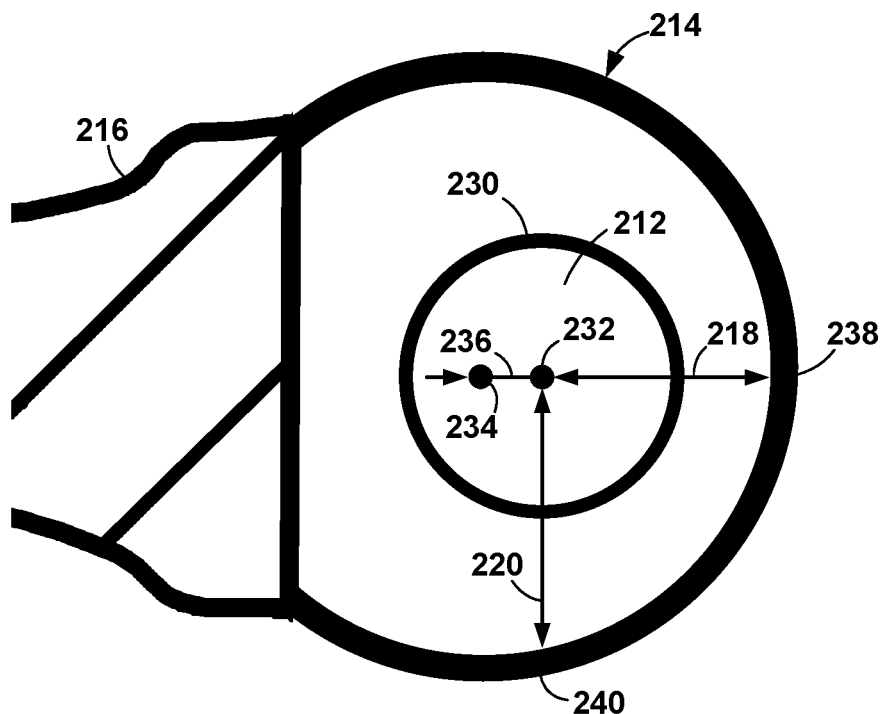
FIG. 28 is a cross-sectional view of another configuration of the cam.

In the second configuration, shown in FIG. 28, the cam 214 is round and the cylindrical head 212 is captured in the hole 230, the center 232 of which is offset by an amount 236 from the center 234 of the cam 214. The offset 236 creates a small radius 218 and a large radius 220. The lever 216 extends generally radially from the cam 214 opposite the small radius 218.

One or more coil springs 222 bias the rail clamp 64 to the disengaged position 196. In one configuration, not shown, there is one coil spring 222 on the threaded rod 202. In the illustrated configuration, there are a pair of coil springs 222, one on each pin 164, as in FIGS. 17, 23 and 25.

When the lever 216 is extending away from the rail clamp 64, as in FIGS. 23 and 24, the small radius side 238 of the cam 214 abuts the rail clamp 64 and the springs 222 push the rail clamp 64 away from the rail 12 to the disengaged position 196, thereby disengaging the studs 178 from the linear gear 48 and allowing the shuttle 14 to reciprocate on the rail 12. When the lever 216 is manually pivoted toward the rail clamp 64, as in FIGS. 25 and 26, until the large radius side 240 of the cam 214 abuts the rail clamp 64, the rail clamp 64 is pressed against the rail 12 against the force of the spring 222 to the engaged position 198, thereby engaging the studs 178 with the linear gear 48. When engaged, the studs 178 are pressed into the valleys 56 between the teeth 46, thereby preventing the shuttle 14 from reciprocating on the rail 12.

Optionally, as shown in FIGS. 23 and 25, the cam 214 sits in a curved hollow 226 in the face 168 of the rail clamp 64. The hollow 226 operates as a round bearing surface so that the cam 214 can rotate more easily.

The displacement 184 of the rail clamp 64 between the disengaged position 196 and the engaged position 198, shown in FIG. 22, is the difference between the small radius 218 and the large radius 220. The displacement 184 must be large enough so that, when the clamp 64 is disengaged, the studs 178 are outside of the teeth 46 to allow the shuttle 14 to reciprocate on the rail 12. Thus, the displacement 184 is greater than at least the height 182 of the studs 178. In the present design, the displacement 184 is about 0.45 inches.

Thus, it has been shown and described a massage gun holder. Since certain changes may be made in the present disclosure without departing from the scope of the present invention, it is intended that all matter described in the foregoing specification and shown in the accompanying drawings be interpreted as illustrative and not in a limiting sense.

The invention claimed is:

1. A massage gun holder comprising:
   (a) an elongated rail adapted to be mounted to a mounting surface and having two longitudinal edges, at least one of the longitudinal edges having a linear gear;
   (b) a shuttle having a shuttle body, a handle clamp, and a rail clamp;
   (c) the shuttle body having a curved handle depression in the front surface and a rail slot in the back surface through which the rail head reciprocates, the rail slot having a fixed side wall;
   (d) the handle clamp having a curved central portion with a pivot end and a securement end, the pivot end being pivotally mounted to the shuttle body such that the handle clamp pivots between a closed position wherein the curved central portion aligns with the handle depression to form a handle ligature that is adapted to securely hold a massage gun handle, and an open position;
   (e) a handle clamp securement securing the handle clamp in the closed position, the handle clamp securement having a threaded rod attached to the shuttle body and a knob that screws onto the threaded rod against the securement end of the handle clamp;
   (f) the rail clamp securing the shuttle to the rail, the rail clamp including a rail clamp body that reciprocates in an opening in the shuttle body, a foot having a surface that forms a movable side wall of the rail slot opposite the fixed side wall, the movable side wall having an elongated movable groove complimentary to the linear gear, at least one stud extending into the rail slot from the movable groove, the rail clamp reciprocating between a disengaged position wherein the at least one stud is disengaged from the linear gear thereby allowing the shuttle to reciprocate on the rail, and an engaged position wherein the at least one stud is engaged with the linear gear thereby preventing the shuttle from reciprocating on the rail; and
   (g) a levered cam mechanism having a cam rotated by a lever for moving the rail clamp between the disengaged position and the engaged position.

2. The massage gun holder of claim 1 wherein the rail is adapted to be mounted to the surface at a base and the longitudinal edges are on a head, whereby the base raises the head from the surface.

3. The massage gun holder of claim 1 wherein both longitudinal edges having a linear gear.

4. The massage gun holder of claim 1 wherein the fixed side wall has an elongated fixed groove complimentary to the linear gear.

5. The massage gun holder of claim 1 wherein the handle clamp securement includes a securement slot in the securement end of the handle clamp, the threaded rod pivotally mounted to the shuttle body to pivot between a securing position wherein the threaded rod extends through the securement slot and an unsecuring position wherein the threaded rod does not extend through the securement slot, whereby the knob is screwed against the securement end when the threaded rod is in the securing position.

6. The massage gun holder of claim 1 wherein the levered cam mechanism includes a threaded rod anchored in the shuttle body and extending through a hole in the rail clamp, the cam pivotally attached to the threaded rod, the lever attached to the cam to manually pivot the cam on the threaded rod to move the rail clamp between the disengaged position and the engaged position.

7. The massage gun holder of claim 1 wherein the rail clamp cam mechanism includes at least one spring to bias the rail clamp to the disengaged position.

\* \* \* \* \*